United States Patent
Tourneur et al.

(10) Patent No.: US 8,080,151 B2
(45) Date of Patent: Dec. 20, 2011

(54) PROCESS FOR TREATING SALT IN A POROUS STRUCTURE AND CORRESPONDING APPARATUS

(75) Inventors: Christian Tourneur, Le Mesnil St Denis (FR); Didier Keisser, Sèvres (FR)

(73) Assignee: Soletanche Freyssinet, Rueil Malmaison (FR)

( * ) Notice: Subject to any disclaimer, the term of this patent is extended or adjusted under 35 U.S.C. 154(b) by 218 days.

(21) Appl. No.: 12/498,923

(22) Filed: Jul. 7, 2009

(65) Prior Publication Data
US 2010/0012508 A1    Jan. 21, 2010

(30) Foreign Application Priority Data
Jul. 9, 2008  (FR) ...................... 08 03908

(51) Int. Cl.
C23F 13/02   (2006.01)
C23F 13/04   (2006.01)
(52) U.S. Cl. ......... 205/734; 205/725; 205/726; 205/727
(58) Field of Classification Search .................. 204/515, 204/230.2, 230.6; 205/734, 725, 726, 727
See application file for complete search history.

(56) References Cited

U.S. PATENT DOCUMENTS

| | | | |
|---|---|---|---|
| 4,600,486 | A | 7/1986 | Oppitz |
| 5,368,709 | A | 11/1994 | Utklev |
| 6,372,109 | B1 | 4/2002 | Bjerke et al. |
| 6,387,244 | B1 * | 5/2002 | Lyublinski ............ 205/734 |

FOREIGN PATENT DOCUMENTS

| | | |
|---|---|---|
| EP | 0398117 | 11/1990 |
| EP | 0401519 | 12/1990 |

OTHER PUBLICATIONS

French Search Report for FR0803908 issued Feb. 5, 2009.

* cited by examiner

Primary Examiner — Bruce Bell
(74) Attorney, Agent, or Firm — Meyertons, Hood, Kivlin, Kowert & Goetzel, P.C.; Eric B. Meyertons

(57) ABSTRACT

Process for the electrochemical treatment of a construction comprising a porous medium, a corrodible substance disposed in the porous medium, the construction having electrically conductive properties, comprising the application of an external electrode (3) to a surface (2) of the construction, the external electrode (3) being connected to a terminal of a generator (6), the porous medium being connected to another terminal of the generator (6), and the application of the following four phases at least once: during a first phase lasting between 12 and 360 hours, passing a negative electric current which causes anions to migrate from the porous medium to the external electrode (3) and cations to migrate from the external electrode (3) towards the porous medium, then during a second phase lasting between 2 minutes and 100 hours, interrupting the circulation of the electric current, then during a third phase lasting between 2 minutes and 24 hours, passing a positive electric current, then during a fourth phase lasting between 1 and 120 minutes, interrupting the circulation of the electric current.

11 Claims, 4 Drawing Sheets

PROCESS FOR TREATING SALT IN A POROUS STRUCTURE AND CORRESPONDING APPARATUS

BACKGROUND OF THE INVENTION

1. Field of the Invention

The present invention relates to the field of the regenerative treatment of porous strictures, notably in construction. More particularly, the invention relates to the treatment of porous strictures provided with reinforcements prone to oxidation, particularly in reinforced concrete.

2. Description of the Relevant Art

Concrete forms a medium which is massive, rigid and porous all at the same time. The number and size of the pores vary greatly from one concrete to another depending on the quality of the component materials used and the way in which the concrete is mixed. Concretes intended for constriction in a damp environment or in a salty environment may have their composition and method of use adjusted in an attempt to reduce the size and number of the pores. However, concretes of this kind are subject to movements of the interstitial water, notably as a result of capillary rise coming from the foundations, weathering or spray or mist. The circulation of water is accompanied by a movement of ions.

In reinforced concrete constructions, the steel reinforcements have the function of increasing the tensile strength of the material. Good conservation of the steel therefore ensures that these constructions are long-lasting. In concrete that is in good condition the pH is high, for example around 12, and the steels are spontaneously covered by a natural protection known as passivation. In fact, carbon dioxide from the environment, particularly from the atmosphere, reacts with the cement that makes Up the concrete, forming carbonates, thereby reducing the pH of the solution contained in the pores of the concrete. This phenomenon known as carbonation may cause corrosion of the steel embedded in the concrete. The anions, e.g. chlorides, likely to be found in large quantities close to the steel, modify the nature of the products formed at the interface between the concrete and the steels and prove to be detrimental to passivation. The steels may then corrode. This is also true of the sulphates which may originate from a polluted atmosphere or water and migrate close to the reinforcements. If the reinforcements are corroded, the service life of the structure may be shortened as a result.

Processes are known which set out to regenerate reinforced concrete by re-alkalizing the medium around the reinforcements or by removing pollutants such as chlorides. Reference may be made to the European recommendations on electro chemical procedures for re-alkalizing carbonated concrete (CEN/TS14038-1) or extracting chlorides (pr/TS14038-2). This type of process uses an external electrode, the internal electrode being formed by the steel reinforcement. An electricity generator passes a current between the external electrode and the internal electrode, thus causing the anions to travel towards the surface of the concrete. The treatment is continued for a long time as a function of the concentration of pollutant.

However, the present Applicant has noticed that the electrical resistivity and capacitance of the concrete between the reinforcements and the surface electrode increase greatly. It has been discovered that this phenomenon is due to a steady state of movement of the chemical species in the pores of the concrete and close to the surface of the steels. One of the causes is the polarization which is liable to break down the water around the steels and form hydroxyl anions ($OH^-$). At the same time, cations such as calcium may move towards the steels and form a precipitate with a high electrical resistance. The substantial increase in electrical resistance, by a factor of possibly more than 5, correspondingly reduces the polarization current if the electricity generator supplies a set voltage between the electrode and the reinforcements. If the generator is of the kind with a constant set current, the voltage will be greatly increased as a result and may exceed the maximum value allowed by safety regulations. Moreover, the energy consumption becomes very great. Another reason is in the variation in the composition of the liquid in the pores of the concrete which may temporarily alter the electrical charges on the walls of the pores until a new electrical equilibrium is achieved. If the system is shut down when the electrical resistance becomes too great, the time taken for the steel to depolarize naturally is very long, at least several months and possibly even more than a year.

It is also possible to apply a reverse voltage for a short period in an attempt to remedy the phenomena that cause the increase in electrical resistance and capacitance. In fact, having conducted intensive research into these techniques, the Applicant has discovered that during the circulation phase of a reverse current, hydrogen gas may be released at the external electrode. The presence of hydrogen gas is dangerous. The electrical resistance of the external electrode may also be increased as a result. In other words, the application of a reverse current setting out to lower the electrical resistance of the concrete produces an increase in the electrical resistance in the external electrode which also counteracts the circulation of the current and furthermore risks causing the electrode to heat up, with possible risks of fire or drying out of the electrode in the case of a wet electrode.

The present invention sets out to remedy the situation.

SUMMARY OF THE INVENTION

The process for electrochemical treatment of a construction comprising a porous medium and a corrodible substance disposed in the porous medium, wherein the construction has the property of being electrically conductive, comprises putting an external electrode to a surface of the construction, the external electrode being connected to a terminal of a generator, the porous medium being connected to another terminal of the generator, and the application of the following four steps, at least once, namely passing a negative electric current which enables the anions to migrate from the porous medium to the external electrode and the cations to migrate from the external electrode to the porous medium for a period of between 12 and 360 hours, then interrupting the circulation of the electric current for a period of between 2 minutes and 100 hours, then passing a positive electric current through for a period of between 2 minutes and 24 hours and stopping the circulation of the electric current for a period of between 1 and 120 minutes.

The porous medium may be connected to the other terminal of the generator via the corrodible substance. The interruption of the current between the passage of the negative current and the passage of the positive current may make it possible to check the dampness of the electrode while avoiding disrupting the circuit with the electric current circulating. If the check shows that it is necessary, the external electrode is rewetted. The interruption to the circulation of the current between the application of the positive electric current and the possible application of a new step of negative electric current results in a substantial reduction in the hydrogen gas formed at the external electrode, according to the electrochemical reaction $2H^+ + 2e^- \rightarrow H_2$. This results in a reestablishment of satisfactory electrical conduction characteristics in the external electrode.

The apparatus for electrochemical treatment of a constriction comprising a porous medium and a corrodible substance disposed in the porous medium for carrying out the process described above, in which the construction is electrically conductive by nature, comprises an external electrode positioned on one surface of the construction, a generator having a positive terminal and a negative terminal, the external electrode being connected to one of said terminals, the porous medium being connected to the other terminal of the generator and a reverse switching member configured so as to pass a negative electric current which causes the anions to migrate from the porous medium to the external electrode and cations to migrate from the external electrode to the porous medium for 12 to 360 hours and then stopping the circulation of the electric current for 2 minutes to 100 hours, then passing a positive electric current through for a period of 2 minutes to 24 hours, then stopping the circulation of the electric current for a period of 1 to 120 minutes.

The porous medium may be connected to the other terminal of the generator via a mechanical reinforcement of the construction.

BRIEF DESCRIPTION OF THE DRAWINGS

The present invention will be better understood and further advantages will become more apparent from a study of the detailed description of a number of embodiments by way of example which are in no way limiting and are illustrated by the accompanying drawings, wherein.

Figure 1:
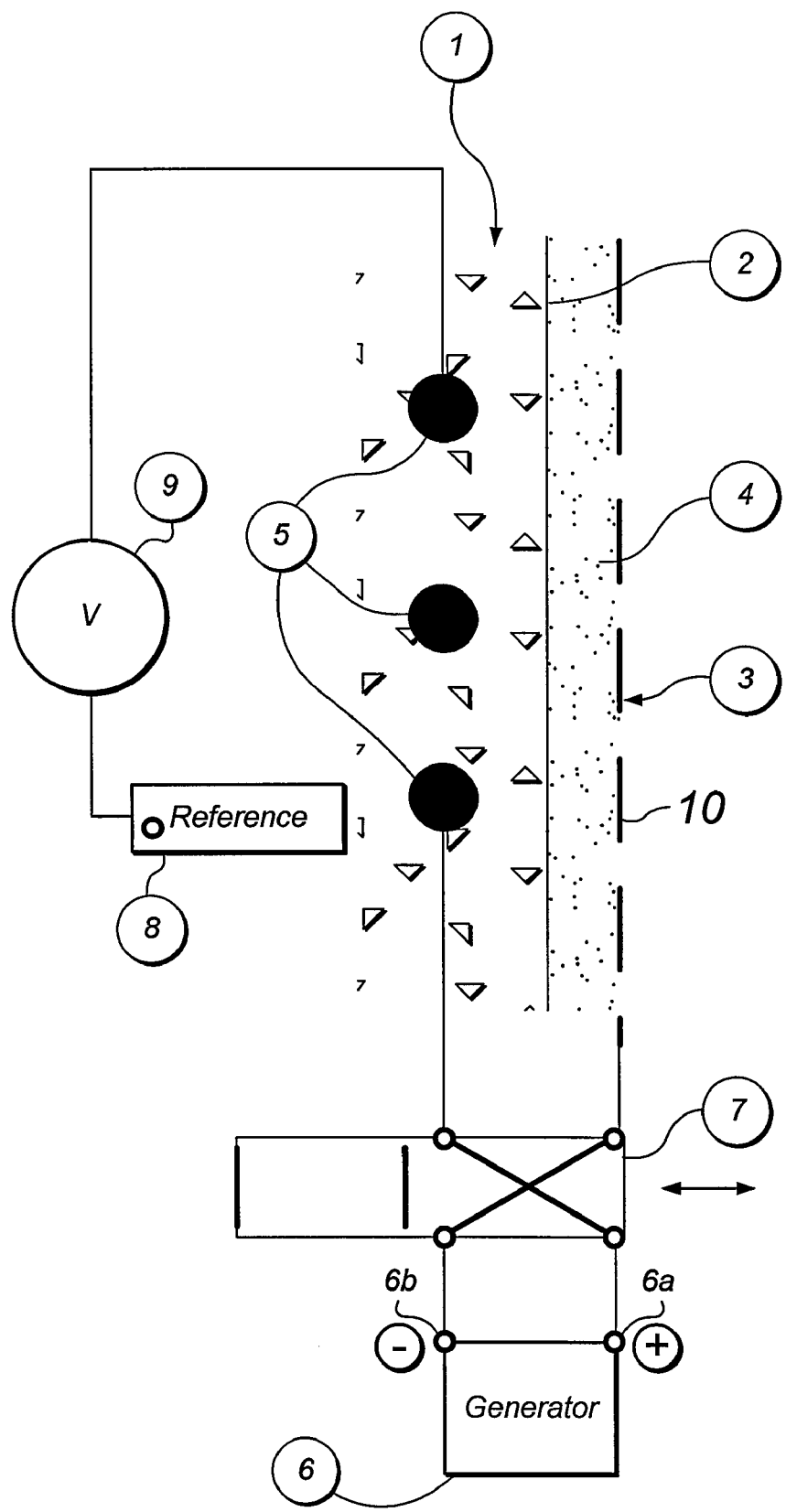
FIG. 1 schematically shows, in a sectional view substantially perpendicular to a surface of the structure, such a structure during the first phase of treatment.

The attached drawings may not only serve to illustrate and complement the invention but may also contribute to its definition, in some cases.

DETAILED DESCRIPTION OF THE PREFERRED EMBODIMENTS

In the prior art, it was envisaged that a surface of a constriction might be treated by wetting. This type of process enables the surface to be cleaned and possibly slightly desalinated to a very shallow depth but has virtually no effect at the level of a reinforcement, i.e. at moderate or great depth.

The document EP 0401519 (Miller) proposes that a voltage comprising a long positive phase and a short negative phase be applied to the electrodes. However, this type of process does not remedy an increase in electrical resistance caused, for example, by the presence of hydrogen gas or drying out. The document EP 0398117 (Miller) provides a confused and even contradictory teaching which makes it difficult to determine its actual teaching.

In any case, the invention sets out to allow improved desalination of a porous structure which is at least partly conductive, notably having a conductive reinforcement. The structure may be of reinforced concrete overall, possibly coated with other elements, or a mixture, for example of reinforced concrete and brick, reinforced concrete and cement bonds, etc. The invention proposes that the anions in the porous structure be treated by improving their migration towards an external electrode, with a reasonable treatment time, a reduced consumption of electrical energy, greater safety for the operators and low risks of escalating costs. As can be seen from FIGS. 1 to 3, a construction comprises a wall 1 having a porous material, e.g. concrete, forming the majority of said wall 1 and a reinforcement 5 prone to corrosion, e.g. steel bars. The steel bars may be round reinforcing bars. The bars 5 are generally arranged regularly, for example so as to form a network of rectangular or triangular meshes. The bars 5 may or may not be fixed to one another. The wall 1 has an outer surface 2. The surface 2 is in contact with the ambient atmosphere, inside or outside a building or construction, in its state of normal use. The wall 2 may also be submerged temporarily or permanently in its normal state.

The treatment apparatus comprises an external electrode 3 positioned on the surface 2 of the wall 1. The external electrode 3 is in contact with all or part of the surface 2. In a zone of the wall 1 that is to be treated, a regular contact is provided between the external electrode 3 and the surface 2 of the wall 1. The external electrode 3 comprises a conductive material, notably an electrolyte 4, which makes it possible to achieve electrical contact with the surface 2 of the wall 1. The electrolyte may be an aqueous solution, e.g. in the form of a paste or gel. The electrolyte 4 may comprise a surfactant. The electrolyte 4 may comprise a thixotropic fluid which may or may not be in gel form. The electrolyte 4 may be held in any position on the surface in a spongy or fibrous material, applied by hand or by spraying. The external electrode 3 also comprises an electricity conductor 10 arranged for example on the surface of the electrolyte 4 opposite the surface 2. The electricity conductor 10 may be in the form of metal wires, e.g. copper or aluminium wires arranged parallel to one another or arranged in the form of a grid. The conductor 10 may be covered by an element (not shown) ensuring on the one hand that the external electrode 3 is sealed to prevent losses of liquid and on the other hand ensuring the mechanical characteristics of the electrolyte 4, thus guaranteeing that it remains permanently in contact with the surface 2.

The treatment apparatus also comprises an electricity generator 6, for example a d.c. current generator or an a.c. current generator provided with a rectifier. The electricity generator 6 may be a source of electrical energy in the broad sense of the term, for example one or more batteries, or a filter rectifier supplied with a mains voltage of 50 or 60 hertz, depending on the country. The generator 6 has a positive terminal 6a and a negative terminal 6b.

In addition, the treatment apparatus comprises a current reversing system 7, for example a reverse switch having two input terminals connected to the output terminals 6a and 6b of the generator 6 and two output terminals one of which is connected to the conductor 10 of the external electrode while the other is connected to a bar 5 of the reinforcement in the wall. The current reversing system has at least three stable operating positions, a non-reversing position (see FIG. 2) in which the positive terminal 6a is connected to the external electrode 3 and the negative terminal 6b is connected to the bar 5 forming an internal electrode, and a reversing position (see FIG. 1) in which the positive terminal 6a is connected to the bar 5 forming the internal electrode and the negative terminal 6b is connected to the conductor 10 of the external electrode 3, and a shut-off position (see FIG. 3) in which the supply is interrupted. The connection between the output terminal of the current reversing system 7 and the bar 5 may be provided by a conductor, for example an insulated copper wire electrically connected to said reinforcing bar 5. For this purpose, a portion of the reinforcing bar 5 may be disengaged from the porous material such as concrete in which it is generally coated, so as to allow contact. The electrical connection can then be made using a clip, a clamping ring, etc. by the external electrode. All or some of the bars 5 may be connected to one another by an additional bar welded to the existing bars.

The electrical connection between the output of the current reversing system 7 and the reinforcement in the wall 1 may be made to each bar 5 or preferably to some of the bars 5. Assuming that the bars 5 are themselves mutually electrically connected, particularly in the case of welded bars, an electrical connection to a single one or even a small number of bars 5 is sufficient. Assuming that the bars 5 are not electrically connected by the construction it is possible to envisage a connection of the output of a current reversing system 7 to a greater number of bars, for example 1 in 4 or even 1 in 3 or possibly 1 in 2, or even all the bars in the zone corresponding to the surface 2 covered by the external electrode 3.

Figure 2:
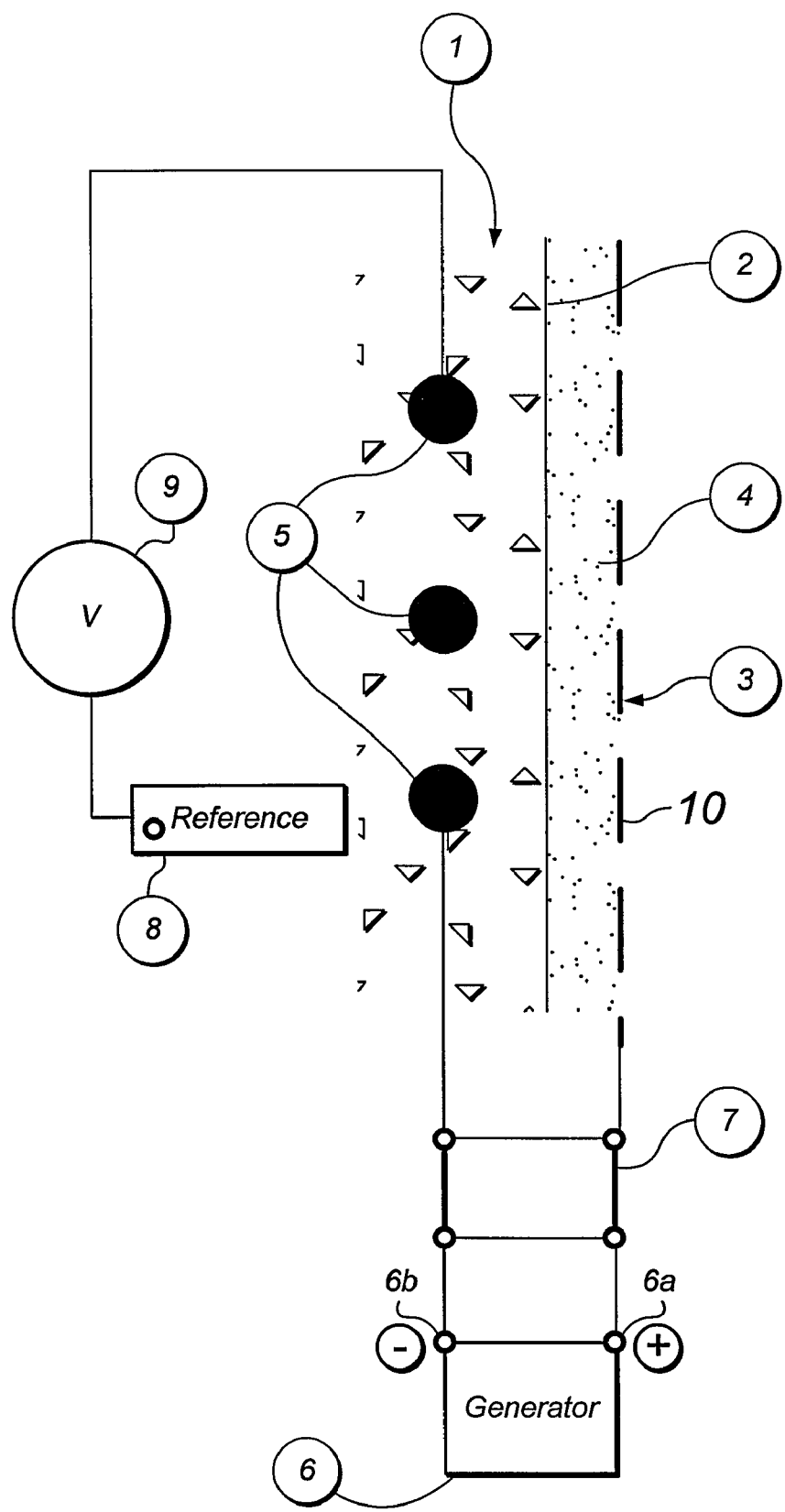
FIG. 2 is a view similar to FIG. 1 during the third phase.
Figure 3:
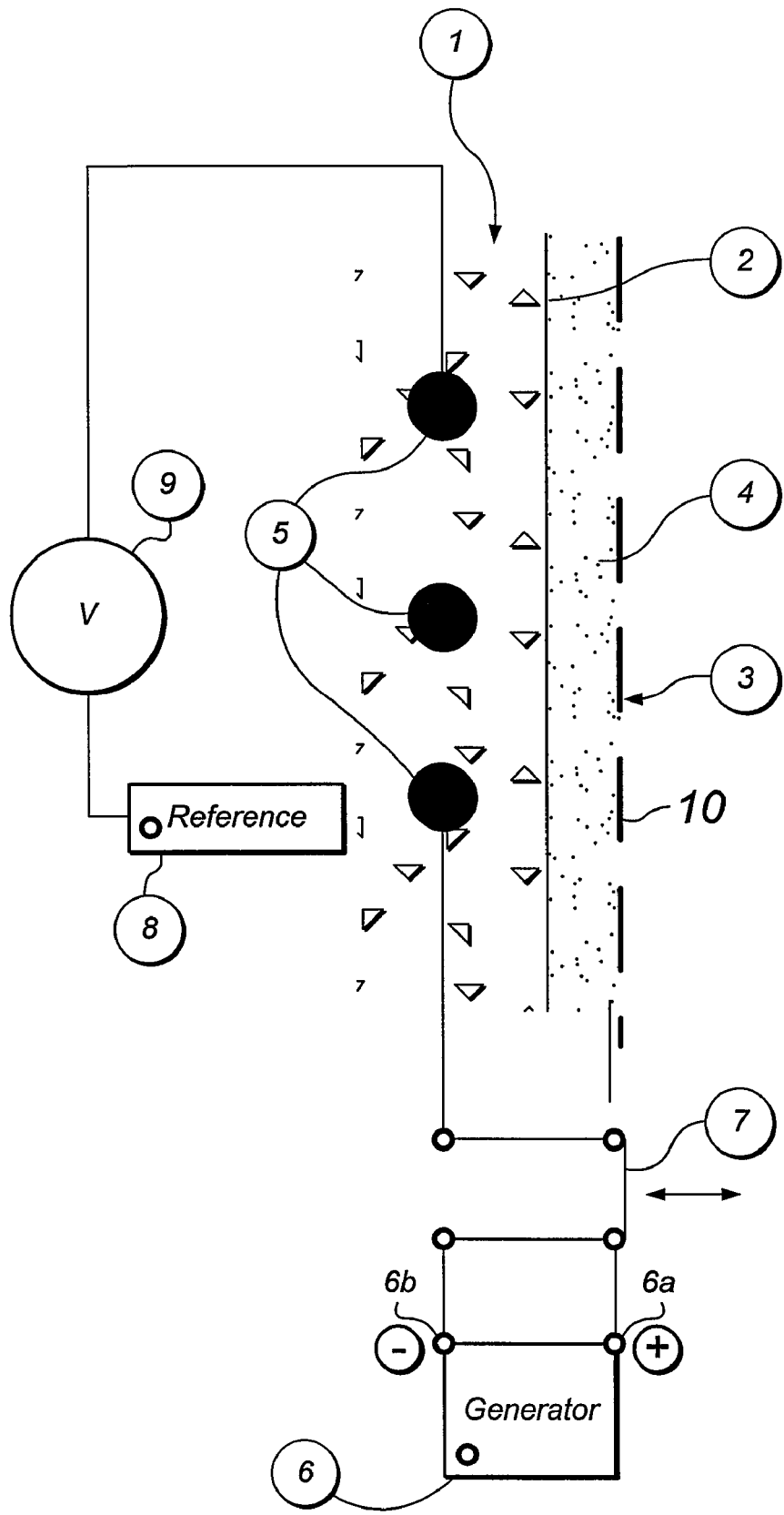
FIG. 3 is a view similar to FIG. 1 during the second and fourth phases.

In the embodiment shown in FIGS. 1 to 3, one of the bars 5 is connected to the current reversing system 7, another bar 5 retains its original state, thus avoiding having to dig into the wall 1 to expose said bar 5. Finally, a third bar 5 is optionally connected to a measuring system which makes it possible to supply a reference. The measuring system comprises a reference electrode 8 connected to a circuit comprising an electrical measuring element, for example a voltmeter and ammeter or more generally a multimeter 9 electrically connected to the reference electrode 8 on the one hand and to the bar 5 in question, on the other hand. The reference electrode 8 may be positioned close to a bar 5. The measuring element makes it possible to monitor the depolarisation continuously or at regular intervals. A monitoring element may be provided with a recorder for storing a plurality of voltage or current values over time. The reference electrode 8 may comprise a metal component, such as a bar, in contact with an electrolyte, for example an aqueous solution, supplying a reference potential.

Figure 4:
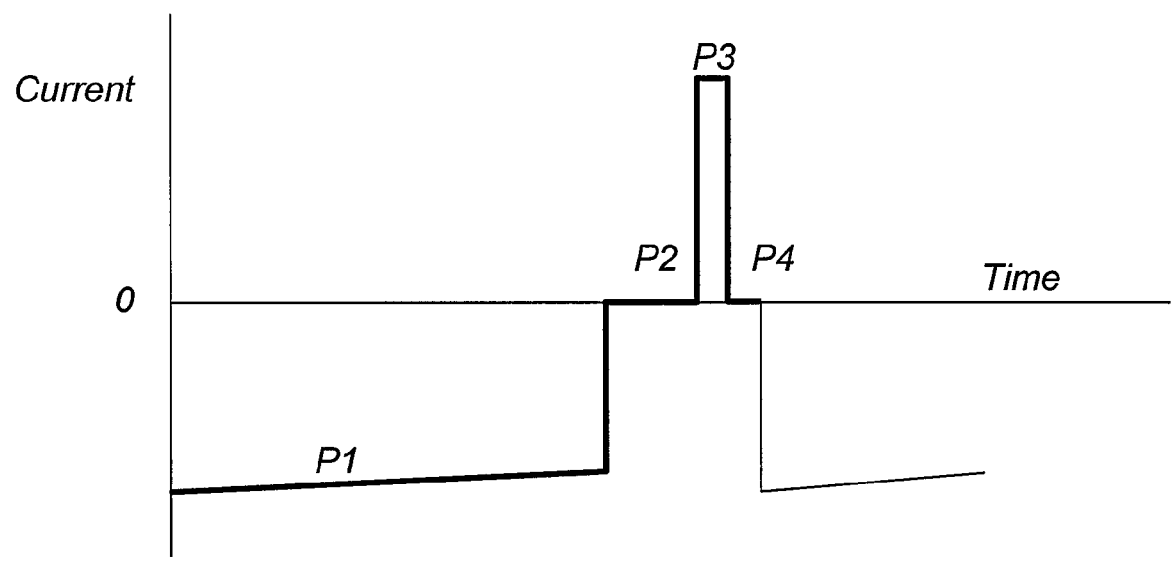
FIG. 4 is a diagram of the development of the current as a function of time.

The electricity generator 6 may be of the current source or voltage source type with a wave form which may be as shown in FIG. 4. The electrochemical treatment of the constriction 1 comprises a first phase P1 with a duration L1 during which a negative electric current is applied, see FIG. 1, enabling anions to be sent from the porous medium of the wall towards the external electrode 3 and, in the opposite direction, enabling cations to be sent from the external electrode 3 towards the porous medium. More particularly, the circulation of the ions is particularly strong close to the bars 5. In other words, the anions close to a bar 5 supplied with electrical energy are particularly driven towards the external electrode 3.

Then the application of electrical energy is cut off during phase P2 of duration L2. In this case, one of the electrical connecting wires may be disconnected or the current reversing system 7 may have a shut-off position, see FIG. 3. The electric current stops flowing. The state of the electrode 3, particularly the state of dampness thereof, is advantageously checked. This check is carried out during phase P2 to avoid disrupting the circuit during a current application phase. If it is found that the electrode 3 is not wet enough, liquid is then added. The liquid may be pure water, tap water or a solution with a high pH, for example more than 10. The high pH solution may be water charged with alkalis, for example lime water.

Then the third step P3 of duration L3 of applying a positive current is carried out, causing the depolarisation of the bars 5 that form the internal electrode (FIG. 2). The fourth step P4 of duration L4 of interrupting the flow of electric current is then carried out, for example in the same manner as in step P2 (see FIG. 3). During step P3, hydrogen gas may be released at the external electrode 3. In the example where the external electrode 3 comprises a fibrous material impregnated with liquid, the release of hydrogen may possibly have the effect of locally modifying the contact between the fibrous material and the conductor 10 or the contact between the fibrous material and the surface 2 of the wall 1. Stopping the circulation of the electric counter-polarisation current at the end of step P3 enables self-repair of any contact altered by the release of hydrogen as a result of the electrochemical reaction: $2H^+ + 2e^- \rightarrow H_2$.

At the end of phase P4, either it is found that the migration of anions is sufficient, in that the wall 1 has been suitably desalinated and the process is stopped, or a new step P1 is begun, followed by steps P2, P3 and P4. The duration L1 of step P1 is generally greater than the durations L2, L3 or L4. The duration L1 may be between 12 and 360 hours, preferably between 96 and 240 hours. The duration L2 is generally greater than the duration L4 and less than or equal to the duration L3. The duration L2 may be between 2 minutes and 100 hours, preferably between 5 minutes and 24 hours. The duration L3 is generally greater than the duration L4. The duration L3 may be between 2 minutes and 24 hours, preferably between 10 minutes and 10 hours. The duration L4 is generally between 1 and 120 minutes, preferably between 5 and 60 minutes. A duration L1, L2, L3 and/or L4 may be predetermined or determined as a function of operating parameters measured. The end of the first phase may be determined by a polarization condition of the construction and the end of the third phase may be determined by a polarization condition of the construction. The polarization condition of the construction may be a polarization value of a metal reinforcement of the construction, measured for example by means of a reference electrode and a volt meter.

The Applicant has carried out forced depolarization tests with the aim of extracting $Cl^-$ ions. During these tests it was found that the anode and cathode are brought into equilibrium after a period of operation of about 100 Ah per square meter of reinforcement. The reinforcement surface is defined by the surface delimited by the metal reinforcement supplied with electrical energy. The tests were carried out with identical testpieces of cellular concrete 5×5 cm in cross-section and 10 cm long in which a hole 20 mm deep is formed from the short side measuring 5×5 cm to 30 mm from one of the edges in order to insert a steel reinforcement 12 mm in diameter sealed with white cement. The testpieces are placed in separate tanks containing an electrolyte consisting of coloured water to which 10 grams per liter of NaCl have been added. A counter-plate forming the external electrode of stainless steel is placed in the bottom of the tank and connected to the plus pole of a 32 volt source. The minus pole is connected to the reinforcement of the test piece, thus forming a cathode during polarisation. On one of the testpieces, polarization is carried out for 12 hours, followed by depolarization with the current switched off for 4 hours. For the other test piece, polarization lasts for 16 hours and the depolarization accelerated by current reversal is carried out for 10 minutes. In a control test piece which is not supplied with current, there is a simple capillary rise of electrolyte in the test piece. In the testpieces subjected to the electric current, oxidation of the anode is found. The depolarization is measured relative to a control electrode of copper/copper sulphate ($Cu/CuSO_4$).

On the testpiece which is depolarized naturally by switching off the current, there is found to be polarization at 1580 millivolts before the stoppage, falling to 699 millivolts once the polarization current is switched off, then to 595 millivolts after 4 hours of no current, i.e. a reduction of 104 millivolts.

On the testpiece which benefits from forced depolarization, there is a polarization of 1512 millivolts at the end of the current application phase dropping to 750 millivolts after the current is switched off, then to 300 millivolts after 10 minutes of polarity reversal, i.e. depolarization current. The fall in polarization is therefore 300 millivolts over 10 minutes, by comparison with 104 millivolts over 4 hours in the previous test. Thus, for an elapsed time which is 24 times shorter, the depolarization is found to be 3 times greater. It will be noted that between the end of the polarization current and the application of the depolarization current, there was a period of 10 minutes corresponding to step P2.

The chemical composition of the electrolyte 4 may be optimised as a function of the nature of the anions to be extracted from a construction. A previous step of analysing the anions which are to be migrated may be carried out. It is then chosen to charge the electrolyte 4 with one or more cations adapted to the anion whose migration is to be preferentially brought about. It is also possible to add a surfactant to the liquid in order to modify the surface tension of the pores so as to favour the extraction of chlorine, for example an ionic lye or diethanolamine $NH(CH_2CH_2OH)_2$. At least one surfactant may be added to the electrolyte 4 in order to improve the cohesion of the electrolytic liquid, e.g. a liquid soap. In this way intimate contact between the surface 2 of the wall 1 and the electrolyte 4 is promoted, resulting in accelerated migration of the ions that are to be treated.

The treatment apparatus may also comprise monitoring means capable, for example, of deciding the transition from one step to another, for example the end of the first step when the current supplied by the generator 6 falls below a threshold. The end of the third depolarization step may also be determined when the depolarization current falls below a threshold. The end of the first step may be decided when the polarization voltage of the wall 1 monitored by the multimeters 9, for example, rises above a ceiling. The end of the third step may be decided when the tension measured by the multimeter 9 falls below a threshold. The duration of steps P2 and P4 may be predetermined, for example regulated to a fixed duration. The duration of step P2 may be determined by an operator carrying out a check on the dampness of the electrolyte 4. Alternatively, the duration of the step P2 may be determined by the time taken for automatic measurement of the dampness, using a dampness sensor located in the electrolyte 4 and active during said phase P2.

The invention claimed is:

1. Process for electrochemical treatment of a construction comprising a porous medium and a corrodible substance disposed in the porous medium, the construction having properties of electrical conductivity, wherein the process comprises putting an external electrode to a surface of the construction, the external electrode being connected to a terminal of a generator, the porous medium being connected to another terminal of the generator, and the application of the following four phases at least once:
   a) during a first phase lasting between 12 and 360 hours, passing a negative electrical current which makes it possible to cause anions to migrate from the porous medium towards the external electrode and cations to migrate from the external electrode towards the porous medium, then
   b) during a second phase lasting between 2 minutes and 100 hours, interrupting the circulation of the electric current, then
   c) during a third phase lasting between two minutes and 24 hours, passing a positive electric current, then
   d) during a fourth phase lasting between 1 and 120 minutes, interrupting the circulation of the electric current.

2. Process according to claim 1, in which the duration of the first phase is between 96 and 240 hours, the duration of the second phase is between 5 minutes and 24 hours, the duration of the third phase is between 10 minutes and 10 hours and/or the duration of the fourth phase is between 5 and 60 minutes.

3. Process according to claim 1, wherein the second phase comprises rewetting the external electrode.

4. Process according to claim 1, wherein the external electrode comprises an electrical circuit including conductor wires and an electrolyte.

5. Process according to claim 4, in which at least one surfactant is incorporated in the electrolyte.

6. Process according to one of claim 1, wherein the corrodible substance comprises a steel-based reinforcement, said reinforcement being electrically conductive, said reinforcement forming the electrode connected to the other terminal of the generator (6), said reinforcement forming the cathode during the first phase.

7. Process according to one of claim 1, wherein another electrode is applied to another surface of the construction, said other electrode being connected to the negative terminal of the generator.

8. Process according to claim 1, wherein the porous medium comprises concrete.

9. Process according to one of claim 1, wherein the end of the first phase is determined by a condition of intensity at the terminals of the generator and the end of the third phase is determined by a condition of intensity at the terminals of the generator.

10. Process according to one of claim 1, wherein the end of the first phase is determined by a polarization condition of the construction, and the end of the third phase is determined by a polarization condition of the construction.

11. Process according to claim 10, wherein the polarization condition of the construction is a polarization value of a metal reinforcement in the construction.

* * * * *